US012797771B2

(12) United States Patent
Feng et al.

(10) Patent No.: US 12,797,771 B2
(45) Date of Patent: Nov. 17, 2026

(54) METHOD FOR ENHANCED SEPARATION OF ORGANIC MATTERS IN MIXED COMPONENT WITH SUPERCRITICAL FLUID COMBINATION MEDIUM

(71) Applicant: South China University of Technology, Guangzhou (CN)

(72) Inventors: Yanhong Feng, Guangzhou (CN); Jinping Qu, Guangzhou (CN); Hezhi He, Guangzhou (CN)

(73) Assignee: South China University of Technology, Guangzhou (CN)

( * ) Notice: Subject to any disclaimer, the term of this patent is extended or adjusted under 35 U.S.C. 154(b) by 582 days.

(21) Appl. No.: 18/552,956

(22) PCT Filed: Sep. 16, 2022

(86) PCT No.: PCT/CN2022/119335
§ 371 (c)(1),
(2) Date: Sep. 28, 2023

(87) PCT Pub. No.: WO2023/236388
PCT Pub. Date: Dec. 14, 2023

(65) Prior Publication Data

US 2025/0083067 A1 Mar. 13, 2025

(30) Foreign Application Priority Data

Jun. 9, 2022 (CN) ........................ 202210649001.3

(51) Int. Cl.
*B01D 11/04* (2006.01)
*B01D 11/02* (2006.01)
*B01J 19/00* (2006.01)

(52) U.S. Cl.
CPC ................................ *B01D 11/0403* (2013.01)

(58) Field of Classification Search
CPC ............ B01D 11/0203; B01D 11/0288; B01D 11/0403; B01D 11/0407; B01D 11/0219;
(Continued)

(56) References Cited

U.S. PATENT DOCUMENTS 4,770,780 A 9/1988 Moses
2019/0241537 A1* 8/2019 Dramen ................. C07B 63/00

FOREIGN PATENT DOCUMENTS

CN 101385746 A 3/2009
CN 111974752 A 11/2020
(Continued)

OTHER PUBLICATIONS

Human assisted machine translation of "Study on Extraction of Korean Pine Seed Oilwith Supercritical Carbon Dioxide", China Electronic Journal Publishing House, vol. 28, No. 11 (2007)—No Date.*

(Continued)

*Primary Examiner* — Pranav N Patel
(74) *Attorney, Agent, or Firm* — Renner, Kenner, Greive, Bobak, Taylor & Weber Co. LPA

(57) ABSTRACT

The present disclosure provides a method for enhanced separation of organic matters in a mixed component with a supercritical fluid combination medium. In the present disclosure, the method includes: placing a mixed component to be separated and a cosolvent in a reaction vessel, suspending the mixed component to be separated above a liquid level line of the cosolvent, and introducing a supercritical fluid into the reaction vessel to conduct supercritical fluid separation; where during the supercritical fluid separation, a separation temperature is changed periodically within a supercritical temperature range of the supercritical fluid combination medium. The supercritical fluid combination medium has characteristic parameters that change with temperatures, so as to obtain a higher separation yield with low energy consumption. In this way, a separation time is shortened, and a separation efficiency of the mixed component in a supercritical fluid environment is effectively improved.

15 Claims, 13 Drawing Sheets

(58) Field of Classification Search
CPC ......... B01D 11/0411; B01J 2219/00051; B01J 2219/00162; B01J 19/0013; Y02W 30/62
See application file for complete search history.

(56) References Cited

FOREIGN PATENT DOCUMENTS

| | | | |
|---|---|---|---|
| CN | 113999332 | A | 2/2022 |
| CN | 114949924 | A | 8/2022 |
| JP | H07191006 | A | 7/1995 |

OTHER PUBLICATIONS

J Food Sci Technol (Oct. 2019) 56(10):4448-4456. (Year: 2019).*
J. of Supercritical Fluids 129 (2017) 16-27. (Year: 2017).*
Journal of Food Science—vol. 53, No. 6, 1656-1658, 1988. (Year: 1988).*
J. of Supercritical Fluids 98 (2015) 25-32. (Year: 2015).*
Qing-guang Li et al: "Study on Extraction of Korean Pine Seed Oilwith Supercritical Carbon Dioxide", China Electronic Journal Publishing House, vol. 28, No. 11 (2007). (with English Abstract).
Tiancheng Mu et al: "Progress in Cosolvent Effect of Supercritical Fluids and Mixed Fluids", Progress in Chemistry vol. 18, No. 1, (Jan. 2006 (with English Abstract).

* cited by examiner

METHOD FOR ENHANCED SEPARATION OF ORGANIC MATTERS IN MIXED COMPONENT WITH SUPERCRITICAL FLUID COMBINATION MEDIUM

CROSS REFERENCE TO RELATED APPLICATION

The present application is a national stage application of International Patent Application No. PCT/CN2022/119335, filed on Sep. 16, 2022, which claims priority to the Chinese Patent Application No. 202210649001.3, filed with the China National Intellectual Property Administration (CNIPA) on Jun. 9, 2022, and entitled "METHOD FOR ENHANCED SEPARATION OF ORGANIC MATTERS IN MIXED COMPONENT WITH SUPERCRITICAL FLUID COMBINATION MEDIUM", which is incorporated herein by reference in its entirety.

TECHNICAL FIELD

The present disclosure relates to the technical field of supercritical fluids, in particular to a method for enhanced separation of organic matters in a mixed component with a supercritical fluid combination medium.

BACKGROUND

Supercritical fluid separation of a mixed component refers to contacting a supercritical fluid with a mixed component to be separated in a supercritical state. By introducing a cosolvent suitable for component separation requirements, components with different polar characteristics, boiling points, and molecular weights can be selectively separated (referring to: Tiancheng Mu, Buxing Han. Progress in Cosolvent Effect of Supercritical Fluids and Mixed Fluids [J]. *Progress in Chemistry,* 2006, 18 (1): 5).

Due to its liquid-like density and gas-like low viscosity, supercritical fluids have excellent solubility for macromolecular organic matters. Supercritical $CO_2$ has lower critical temperature and critical pressure, and is easier to form a combination medium with other reagents for separating natural mixed components. When water and/or other types of solvents as a cosolvent are introduced into the supercritical $CO_2$, polarity of the combination medium can be changed only by adjusting relevant parameters of the supercritical fluid. In this way, a dissolution effect of the combination medium can be adjusted on different natural mixed components. At present, there are mainly two existing methods for the separation of a mixed component with the supercritical fluid combination medium. One is to immerse the mixed component into a cosolvent of the supercritical fluid combination medium, and separate the mixed component under fixed environmental state parameters. Since the mixed component is not in direct contact with the supercritical fluid, a separation effect of the supercritical fluid is not fully exerted. As a result, a separation efficiency of the method and a yield of obtained separated components need to be improved. The other is to set flow rates of the supercritical carbon dioxide and the cosolvent, respectively, such that the supercritical fluid combination medium passes through a separation device filled with the mixed component at a certain flow rate. In this method, a supercritical fluid circulation process has high energy consumption, consumption of the cosolvent, and cost.

SUMMARY

In view of this, an objective of the present disclosure is to provide a method for enhanced separation of organic matters in a mixed component with a supercritical fluid combination medium. In the present disclosure, the method can effectively improve a separation efficiency and a yield of obtained separated components, and has low consumption of a cosolvent.

To achieve the above objective, the present disclosure provides the following technical solutions:

The present disclosure provides a method for enhanced separation of organic matters in a mixed component with a supercritical fluid combination medium, where the supercritical fluid combination medium includes a supercritical fluid and a cosolvent; and the method includes the following steps:

placing a mixed component to be separated and the cosolvent in a reaction vessel, suspending the mixed component to be separated above a liquid level line of the cosolvent, and introducing the supercritical fluid into the reaction vessel to conduct supercritical fluid separation; where during the supercritical fluid separation, a separation temperature is changed periodically within a supercritical temperature range of the supercritical fluid combination medium.

Preferably, the supercritical fluid is one or more selected from the group consisting of supercritical $CO_2$, supercritical water, supercritical ethanol, supercritical methanol, supercritical ammonia, and a supercritical alkane.

Preferably, the cosolvent is water and/or an organic alcohol.

Preferably, the supercritical fluid and the cosolvent are at a molar ratio of 1:1 to 1:10.

Preferably, the mixed component and the cosolvent are at a mass-to-volume ratio of 1 g:(1-15) mL.

Preferably, the supercritical fluid separation is conducted at 31.26 °C to 200 °C and a pressure of 7.38 MPa to 65 MPa for 10 min to 180 min.

Preferably, the separation temperature is periodically changed 1 to 10 times.

Preferably, a process of changing the separation temperature periodically includes:

periodically increasing or decreasing the separation temperature by 5 °C to 100 °C.

Preferably, the mixed component is a natural mixed component and/or an artificially synthetic mixed component.

Preferably, the natural mixed component is one or more selected from the group consisting of a plant tissue, an animal tissue, and a rock formation containing organic matters.

Preferably, the plant tissue is one or more selected from the group consisting of a *Cannabis sativa* stalk fiber, an *eucalyptus* fiber, a bamboo fiber, Balsa wood, and *Paulownia*; and the animal tissue is one or more selected from the group consisting of a natural dairy product, an animal fat, and an animal carapace.

Preferably, the artificially synthetic mixed component is one or more selected from the group consisting of waste plastics, waste rubber, and ink-containing waste paper.

Preferably, when lignin is separated from a plant fiber, the separation temperature fluctuates 1 to 5 times at an interval of 100 °C to 200 °C, and a heat preservation time in a constant-temperature stage is 5 min to 30 min.

Preferably, when astaxanthin is separated from the animal tissue, the separation temperature fluctuates 1 to 5 times at an interval of 31.26 °C to 70 °C under a pressure of 30 MPa to 65 MPa, and a heat preservation time in a constant-temperature stage is 1 min to 10 min.

Preferably, when cholesterol is separated from the natural dairy product, the separation temperature fluctuates 1 to 5 times at an interval of 31.26 °C to 70 °C under a pressure of 7 MPa to 15 MPa, and a heat preservation time in a constant-temperature stage is 1 min to 10 min.

Preferably, when a fatty acid is separated from the animal fat, the separation temperature fluctuates 1 to 5 times at an interval of 31.26 °C to 50 °C under a pressure of 8 MPa to 20 MPa, and a heat preservation time in a constant-temperature stage is 60 min to 200 min.

The present disclosure provides a method for enhanced separation of organic matters in a mixed component with a supercritical fluid combination medium, where the supercritical fluid combination medium includes a supercritical fluid and a cosolvent; and the method includes the following steps: placing a mixed component to be separated and the cosolvent in a reaction vessel, suspending the mixed component to be separated above a liquid level line of the cosolvent, and introducing the supercritical fluid into the reaction vessel to conduct supercritical fluid separation; where during the supercritical fluid separation, a separation temperature is changed periodically within a supercritical temperature range of the supercritical fluid combination medium. In the present disclosure, a traditional treatment method of immersing a mixed component in a cosolvent is changed, the mixed component and the cosolvent are placed in a reaction vessel, and the mixed component is not in contact with the cosolvent, that is, a liquid phase non-contact method is adopted. On one hand, a dosage of the cosolvent can be reduced. On the other hand, during the supercritical fluid separation, the mixed component can fully contact with the supercritical fluid, such that an effect of the supercritical fluid can be fully exerted, and a separation efficiency and a yield of obtained separated components can be improved. The separation temperature of the supercritical fluid is periodically changed, and the supercritical fluid combination medium has characteristic parameters that change with temperatures, so as to obtain a higher separation yield with low energy consumption. In this way, a separation time is shortened. Specifically, when the temperature changes periodically, a supercritical phase-liquid phase boundary line of the supercritical fluid combination medium is not stable in the space. The densities of the supercritical phase and the cosolvent liquid phase fluctuate dynamically within a certain range, resulting in a strong material exchange between the supercritical phase and the liquid phase. As a result, the migration of obtained separated components by the supercritical fluid combination medium is accelerated, thereby enhancing a separation effect of the supercritical fluid combination medium.

DETAILED DESCRIPTION OF THE EMBODIMENTS

Figure 1:
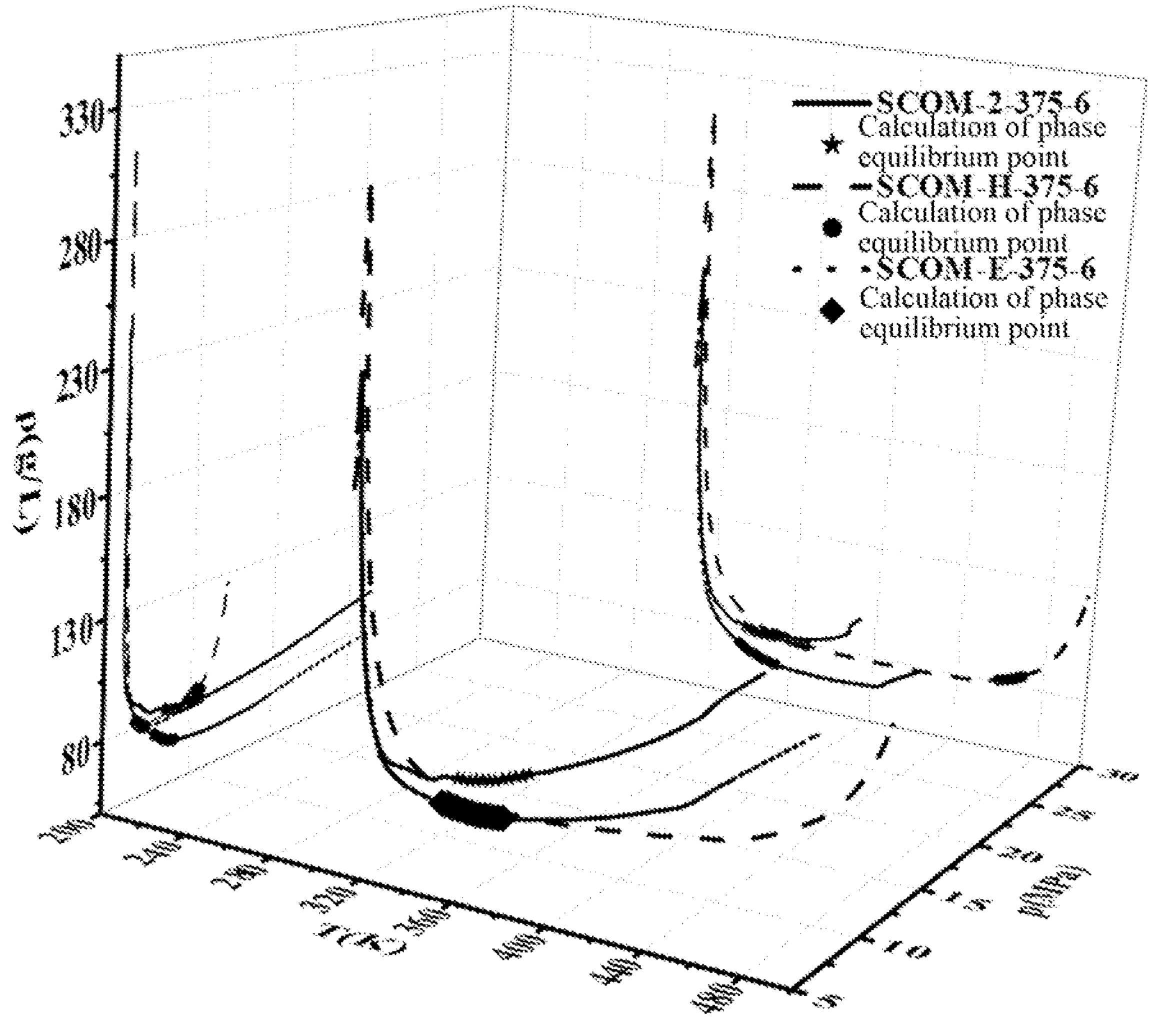
FIG. 1 shows a variation curve of a density of a combination medium with temperature, taking the combination medium formed by supercritical $CO_2$, water, and ethanol as an example.

The present disclosure provides a method for enhanced separation of organic matters in a mixed component based on a supercritical fluid combination medium, where the supercritical fluid combination medium includes a supercritical fluid and a cosolvent; and the method includes the following steps:

suspending a mixed component to be separated above a liquid level line of the cosolvent, and introducing the supercritical fluid into the reaction vessel to conduct supercritical fluid separation; where during the supercritical fluid separation, a separation temperature is changed periodically within a supercritical temperature range of the supercritical fluid combination medium.

In the present disclosure, the mixed component is a mixed component containing organic matters and suitable for component separation using a supercritical fluid. The mixed component is preferably a natural mixed component and/or an artificially synthetic mixed component.

In the present disclosure, the natural mixed component is preferably one or more selected from the group consisting of a plant tissue, an animal tissue, and a rock formation containing organic matters.

In the present disclosure, the plant tissue is preferably one or more selected from the group consisting of *Cannabis sativa* stalk fiber, an *eucalyptus* fiber, a bamboo fiber, Balsa wood, and *Paulownia*. When the natural mixed component is a plant fiber, preferably lignin and/or hemicellulose in the plant fiber is separated and extracted.

In the present disclosure, the animal tissue is preferably one or more selected from the group consisting of a natural dairy product, an animal fat, and an animal carapace. The natural dairy product is preferably one or more selected from the group consisting of milk, a whole milk powder, and a pure milk powder. When the natural mixed component is the natural dairy product, preferably cholesterol in the natural dairy product is separated and extracted. There is no special requirement on a type of the animal fat. When the natural mixed component is the animal fat, preferably a fatty acid in the animal fat is separated and extracted.

In the present disclosure, the artificially synthetic mixed component is preferably one or more selected from the group consisting of waste plastics, waste rubber, and ink-containing waste paper. The waste plastics are preferably plastic lunch boxes and/or express bags.

In the present disclosure, when the artificially synthetic mixed component is the waste plastics, preferably a grease in the waste plastics is separated and extracted. When the artificially synthetic mixed component is the waste rubber, preferably an engine oil in the waste rubber is separated and extracted. When the artificially synthetic mixed component is the ink-containing waste paper, preferably ink in the waste paper is separated and extracted.

In the present disclosure, a mixed component to be separated and a cosolvent are placed in a reaction vessel, and the mixed component to be separated and the cosolvent are not in contact with each other to conduct supercritical fluid separation. The mixed component has a particle size of preferably 20 mesh to 200 mesh, more preferably 50 to 150 mesh. When the mixed component has a particle size of greater than 20 mesh, the mixed component is preferably pulverized. There is no special requirement on a pulverization method, and pulverization methods well known to those skilled in the art can be used.

In the present disclosure, the reaction vessel is preferably provided with a screen inside, such that the mixed component is suspended above the liquid level line of the cosolvent, and the mixed component does not contact with the cosolvent.

In the present disclosure, the supercritical fluid is preferably one or more selected from the group consisting of supercritical $CO_2$, supercritical water, supercritical ethanol, supercritical methanol, supercritical ammonia, and a supercritical alkane.

In the present disclosure, the cosolvent is preferably water and/or an organic alcohol, and the organic alcohol is preferably methanol and/or ethanol. As a specific example, the cosolvent includes water and ethanol.

In the present disclosure, in the supercritical fluid combination medium, the supercritical fluid and the cosolvent are at a molar ratio of 1:1 to 1:10, more preferably 1:1 to 1:5.

In the present disclosure, the supercritical fluid separation is conducted at preferably 31.26 °C to 200 °C, more preferably 31.26 °C to 50 °C and a pressure of preferably 7.38 MPa to 35 MPa, more preferably 10 MPa to 30 MPa for preferably 10 min to 180 min, more preferably 30 min to 150 min.

In the present disclosure, a process of periodically changing the separation temperature includes: periodically increasing or decreasing the separation temperature. An increased or decreased separation temperature is still within a supercritical temperature range of the supercritical fluid combination medium. The separation temperature is preferably increased or decreased by 5 °C to 100 °C, more preferably 20 °C to 60 °C, and even more preferably 30 °C to 50 °C. A cycle of periodically changing the separation temperature includes constant-temperature stage and a variable-temperature stage, and a single constant-temperature stage lasts for preferably 5 min to 30 min, more preferably 10 min to 20 min.

In the present disclosure, when periodically changing the separation temperature refers to periodically increasing the separation temperature, the variable-temperature stage includes preferably heating and cooling to a constant temperature. The heating is conducted at preferably 5 °C/min to 20 °C/min, more preferably 10 °C/min to 15 °C/min; and the cooling to a constant temperature is conducted at preferably 10 °C/min to 30 °C/min, more preferably 15 °C/min to 25 °C/min.

In the present disclosure, when periodically changing the separation temperature refers to periodically reducing the separation temperature, the variable-temperature stage includes preferably cooling and heating to a constant temperature. The cooling is conducted at preferably 10 °C/min to 30 °C/min, more preferably 15 °C/min to 25 °C/min; and the heating to a constant temperature is conducted at preferably 5 °C/min to 20 °C/min, more preferably 10 °C/min to 15 °C/min.

In the present disclosure, a single variable-temperature stage lasts for preferably 10 min to 40 min, more preferably 20 min to 30 min.

In the present disclosure, the separation temperature is preferably periodically changed 1 to 10 times, more preferably 1 to 4 times.

In the present disclosure, according to different objects to be separated, the temperature setting needs to match the characteristics of a separated substance. Specifically, when lignin is separated from a plant fiber, the separation temperature fluctuates preferably 1 to 5 times at an interval of 100 °C to 200 °C, and a heat preservation time in a constant-temperature stage is preferably 5 min to 30 min.

When astaxanthin is separated from the animal tissue such as shrimp shells, the separation temperature fluctuates preferably 1 to 5 times at an interval of 31.26 °C to 70 °C under a pressure of 30 MPa to 65 MPa, and a heat preservation time in a constant-temperature stage is preferably 1 min to 10 min.

When cholesterol is separated from the natural dairy product, the separation temperature fluctuates preferably 1 to 5 times at an interval of 31.26 °C to 70 °C under a pressure of 7 MPa to 15 MPa, and a heat preservation time in a constant-temperature stage is preferably 1 min to 10 min.

When a fatty acid is separated from the animal fat, the separation temperature fluctuates preferably 1 to 5 times at an interval of 31.26 °C to 50 °C under a pressure of 8 MPa to 20 MPa, and a heat preservation time in a constant-temperature stage is preferably 60 min to 200 min.

In the present disclosure, FIG. 1 shows a variation curve of a density of a combination medium with temperature, taking the combination medium formed by supercritical $CO_2$, water, and ethanol as an example.

In a coordinate system formed by temperature, pressure, and density, a density gradient behavior of various supercritical fluid combination media presents a strong change trend. When the temperature changes periodically, a supercritical phase-liquid phase boundary line of the supercritical fluid combination medium is not stable in the space. The densities of the supercritical phase and the liquid phase fluctuate dynamically within a certain range, resulting in a strong material exchange between the supercritical phase and the liquid phase. As a result, the migration of obtained separated components by the supercritical fluid combination medium is accelerated, thereby enhancing a separation effect of the supercritical fluid combination medium.

The method for enhanced separation of organic matters in a mixed component with a supercritical fluid combination medium provided by the present disclosure are described in detail below with reference to the examples, but these examples may not be understood as a limitation to the protection scope of the present disclosure.

Example 1

Figure 2:
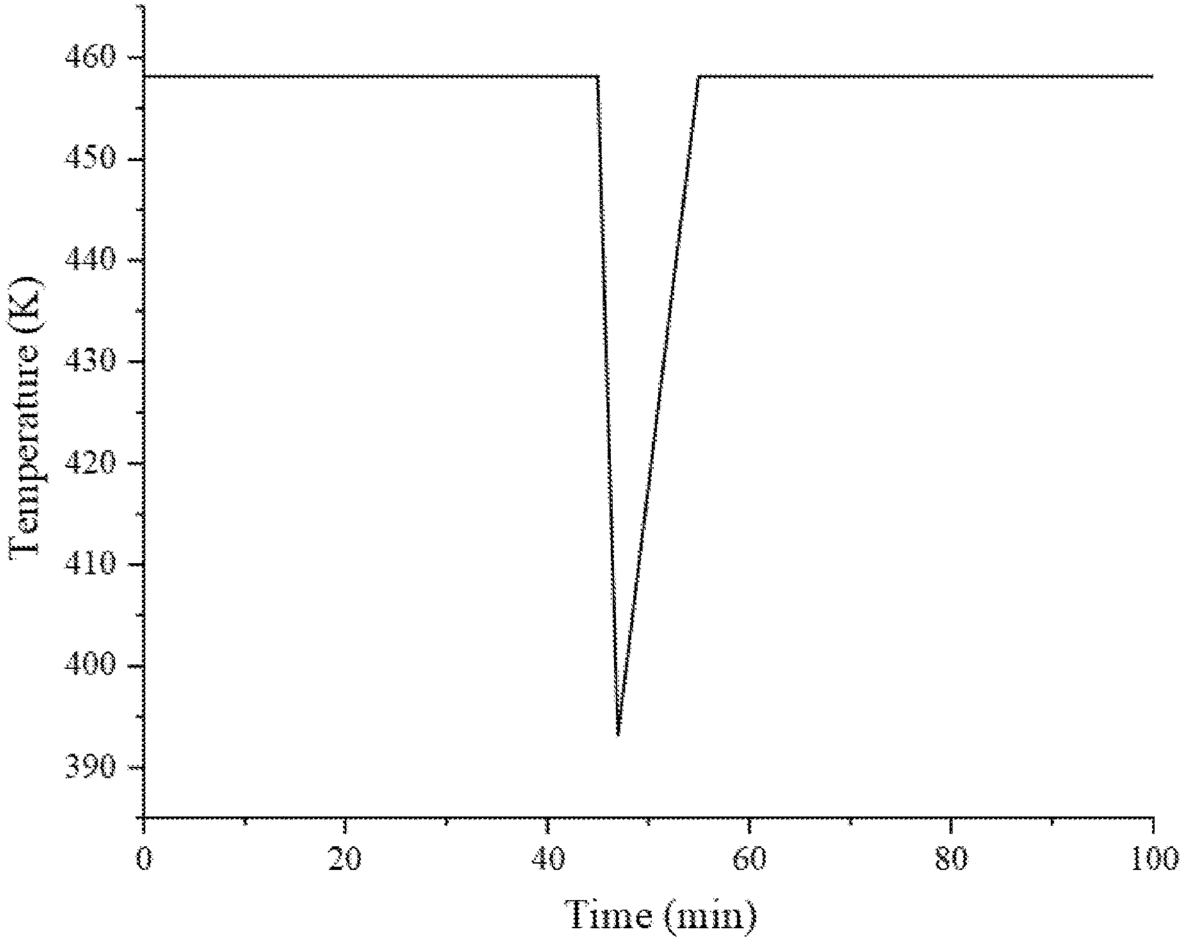
FIG. 2 shows a temperature control procedure of Example 1.

12.5 g of *Cannabis sativa* stalk fiber was taken (with a hemicellulose content of 14.8%). A liquid-to-solid ratio was set at 10:1 (V:m), and 125 mL of deionized water was injected into a separation device. A sample to be treated was suspended above a liquid level line, the separation device was pressed tightly, and $CO_2$ was injected. An initial temperature and an initial pressure of an obtained system were adjusted to 303.15 K and 6 MPa. When the temperature rose to 458.85 K, a separation process of hemicellulose in the *Cannabis sativa* stalk fiber was controlled according to a temperature control procedure shown in FIG. 2. An extraction rate of a hemicellulose degradation product xylan could reach 2.71 g/100 g of raw materials.

Example 2

Figure 3:
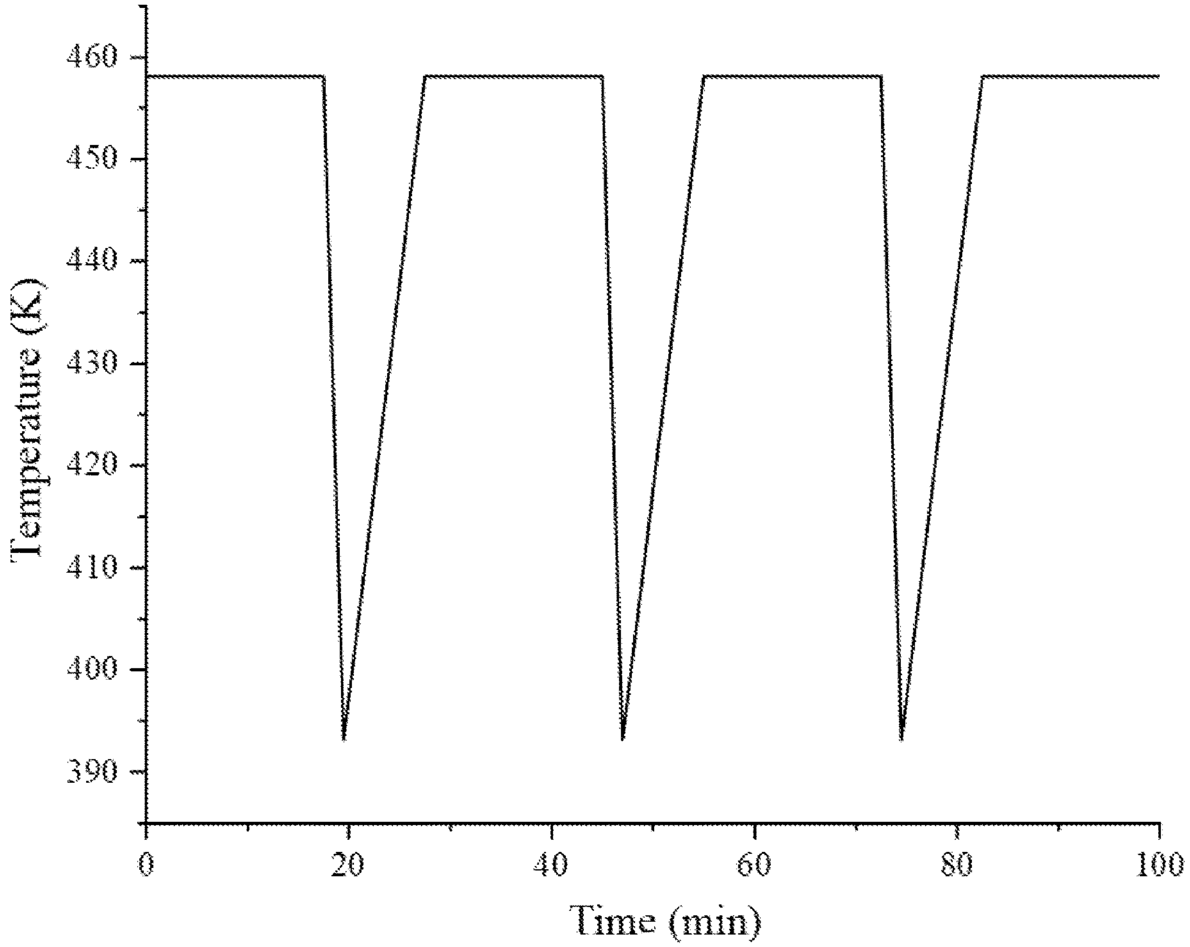
FIG. 3 shows a temperature control procedure of Example 2.

12.5 g of *Cannabis sativa* stalk fiber was taken (with a hemicellulose content of 14.8%). A liquid-to-solid ratio was set at 10:1 (V:m), and 125 mL of deionized water was injected into a separation device. A sample to be treated was suspended above a liquid level line, the separation device was pressed tightly, and $CO_2$ was injected. An initial temperature and an initial pressure of an obtained system were adjusted to 303.15 K and 6 MPa. When the temperature rose to 458.85 K, a separation process of hemicellulose in the *Cannabis sativa* stalk fiber was controlled according to a temperature control procedure shown in FIG. 3. An extraction rate of a hemicellulose degradation product xylan could reach 7.21 g/100 g of raw materials.

Example 3

Figure 4:
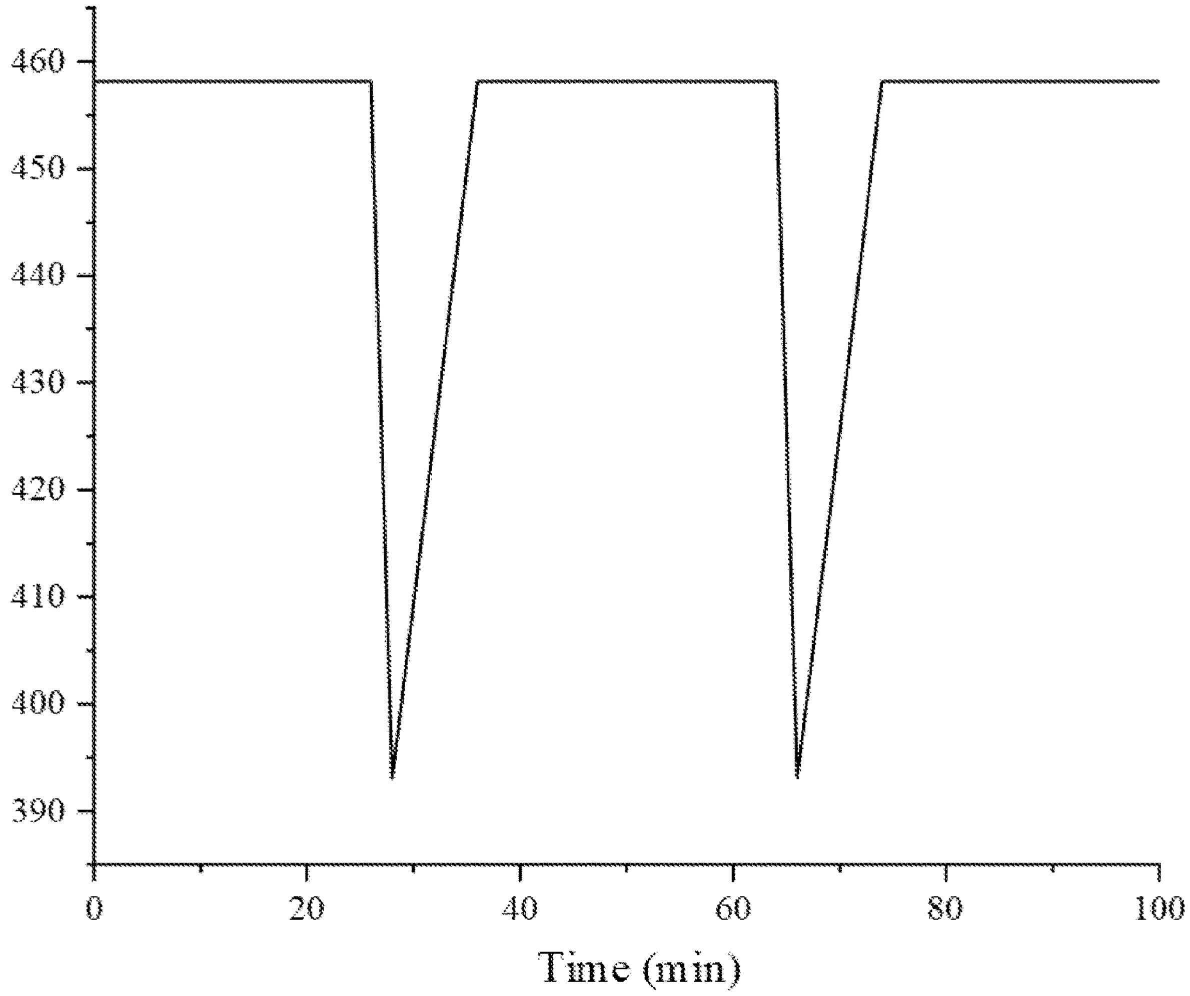
FIG. 4 shows a temperature control procedure of Example 3.

12.5 g of *eucalyptus* fiber was taken (with a hemicellulose content of 16%). A liquid-to-solid ratio was set at 10:1 (V:m), and 125 mL of deionized water was injected into a separation device. A sample to be treated was suspended above a liquid level line, the separation device was pressed tightly, and $CO_2$ was injected. An initial temperature and an initial pressure of an obtained system were adjusted to 303.15 K and 6 MPa. When the temperature rose to 458.85 K, a separation process of hemicellulose in the *eucalyptus* fiber was controlled according to a temperature control procedure shown in FIG. 4. A yield of a hemicellulose degradation product xylan could reach 6.99 g/100 g of raw materials.

Example 4

Figure 5:
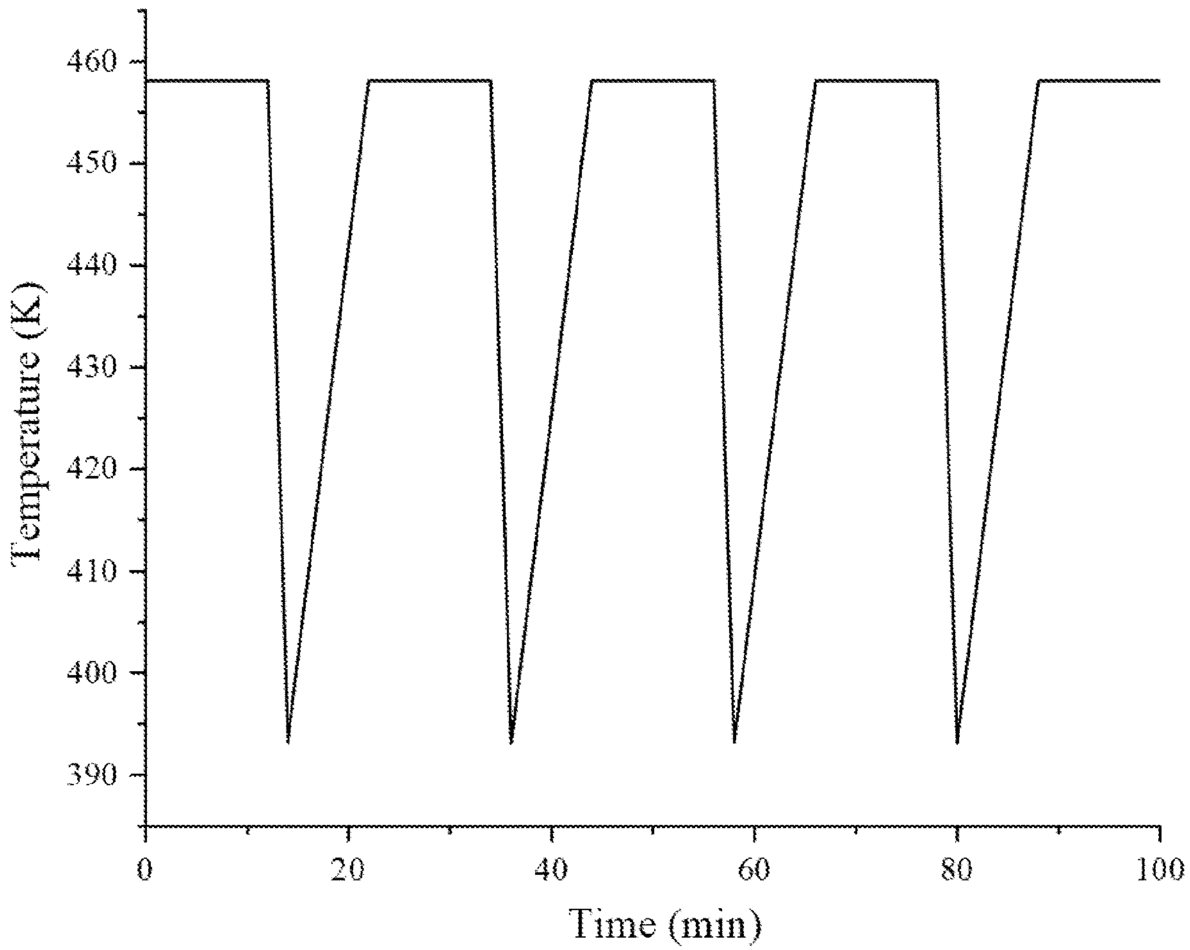
FIG. 5 shows a temperature control procedure of Example 4.

12.5 g of *eucalyptus* fiber was taken (with a hemicellulose content of 16%). A liquid-to-solid ratio was set at 10:1 (V:m), and 125 mL of deionized water was injected into a separation device. A sample to be treated was suspended above a liquid level line, the separation device was pressed tightly, and $CO_2$ was injected. An initial temperature and an initial pressure of an obtained system were adjusted to 303.15 K and 6 MPa. When the temperature rose to 458.85 K, a separation process of hemicellulose in the *eucalyptus* fiber was controlled according to a temperature control procedure shown in FIG. 5. A yield of a product xylan could reach 10.80 g/100 g of raw materials.

Example 5

Figure 6:
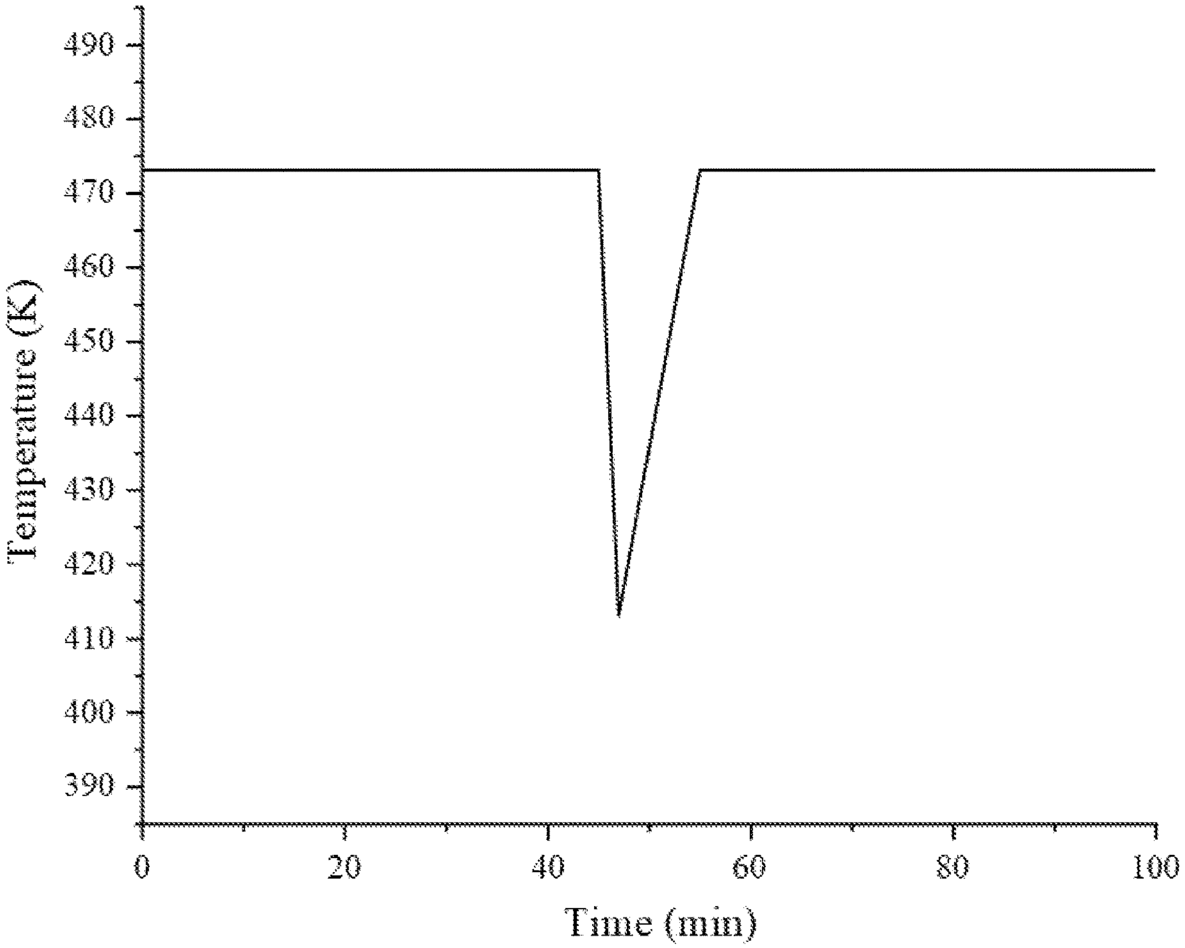
FIG. 6 shows a temperature control procedure of Example 5.

12.5 g of *Cannabis sativa* stalk fiber was taken (with a lignin content of 22%). A liquid-to-solid ratio was set at 10:1 (V:m), 125 mL of an EtOH—$H_2O$ solution with a molar ratio of 1:1 was added to a separation device, and $CO_2$ was injected. A sample to be treated was suspended above a liquid level line, and the separation device was pressed tightly. An initial temperature and an initial pressure of an obtained system were adjusted to 303.15 K and 6 MPa. When the temperature rose to 458.85 K, a separation process of lignin in the *Cannabis sativa* stalk fiber was controlled according to a temperature control procedure shown in FIG. 6. A yield of a product Klason lignin could reach 41.00%.

Example 6

Figure 7:
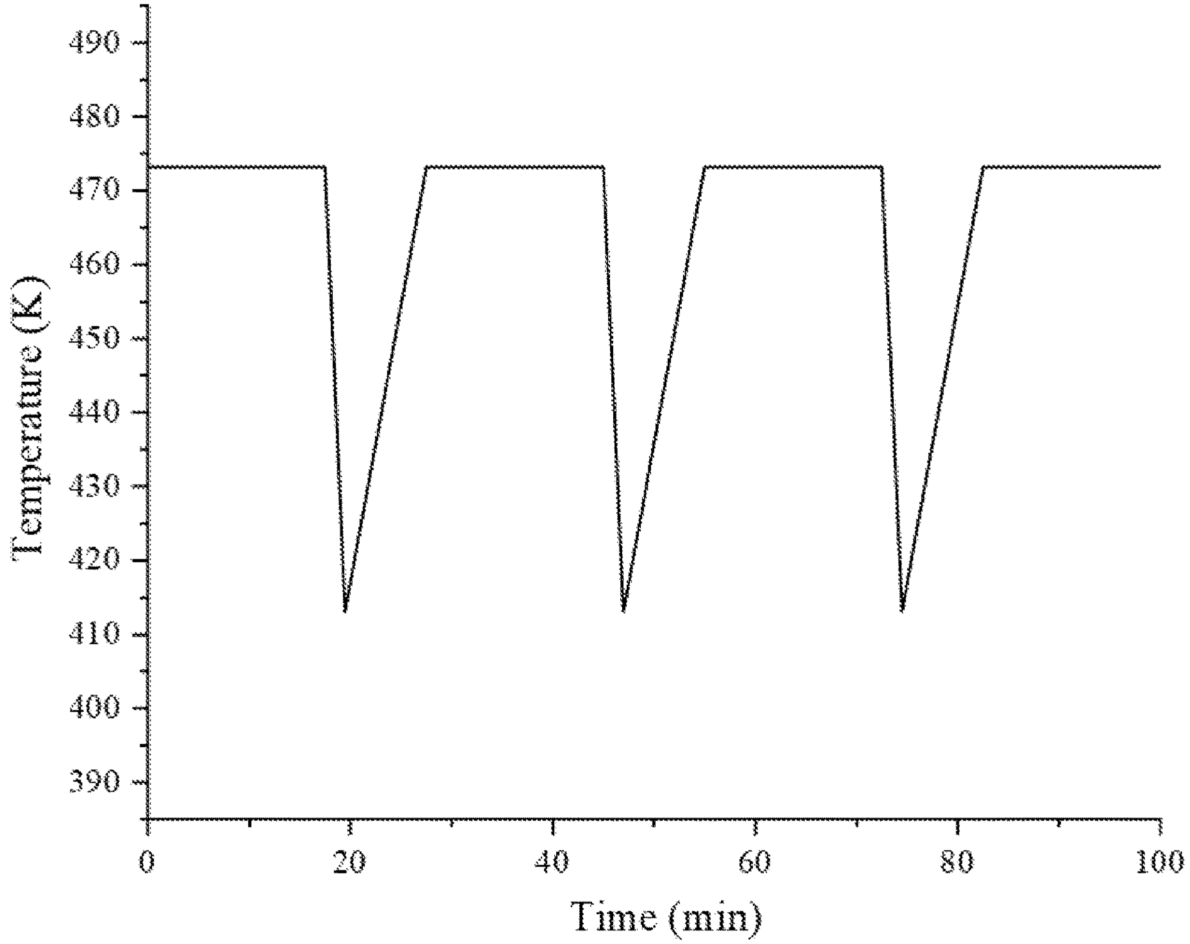
FIG. 7 shows a temperature control procedure of Example 6.

12.5 g of *Cannabis sativa* stalk fiber was taken (with a lignin content of 22%). A liquid-to-solid ratio was set at 10:1 (V:m), 125 mL of an EtOH—$H_2O$ solution with a molar ratio of 1:1 was added to a separation device, and $CO_2$ was injected. A sample to be treated was suspended above a liquid level line, and the separation device was pressed tightly. An initial temperature and an initial pressure of an obtained system were adjusted to 303.15 K and 6 MPa. When the temperature rose to 458.85 K, a separation process of lignin in the *Cannabis sativa* stalk fiber was controlled according to a temperature control procedure shown in FIG. 7. A yield of a product Klason lignin could reach 49.44%.

Example 7

Figure 8:
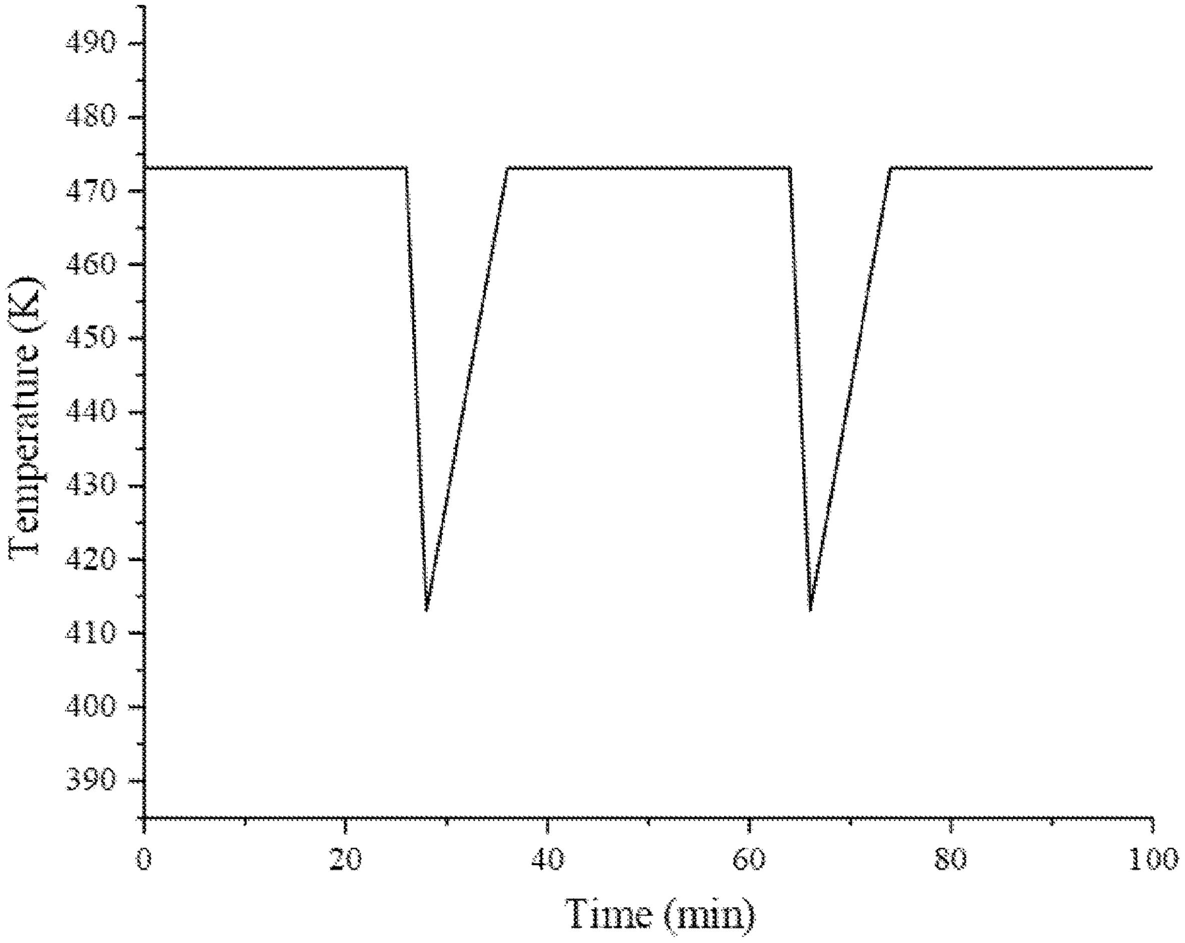
FIG. 8 shows a temperature control procedure of Example 7.

12.5 g of *eucalyptus* fiber was taken (with a lignin content of 33.7%). A liquid-to-solid ratio was set at 10:1 (V:m), 125 mL of an EtOH—$H_2O$ solution with a molar ratio of 1:1 was added to a separation device, and $CO_2$ was injected. A sample to be treated was suspended above a liquid level line, and the separation device was pressed tightly. An initial temperature and an initial pressure of an obtained system were adjusted to 303.15 K and 6 MPa. When the temperature rose to 458.85 K, a separation process of lignin in the *eucalyptus* fiber was controlled according to a temperature control procedure shown in FIG. 8. A yield of a product Klason lignin could reach 63.45%.

Example 8

Figure 9:
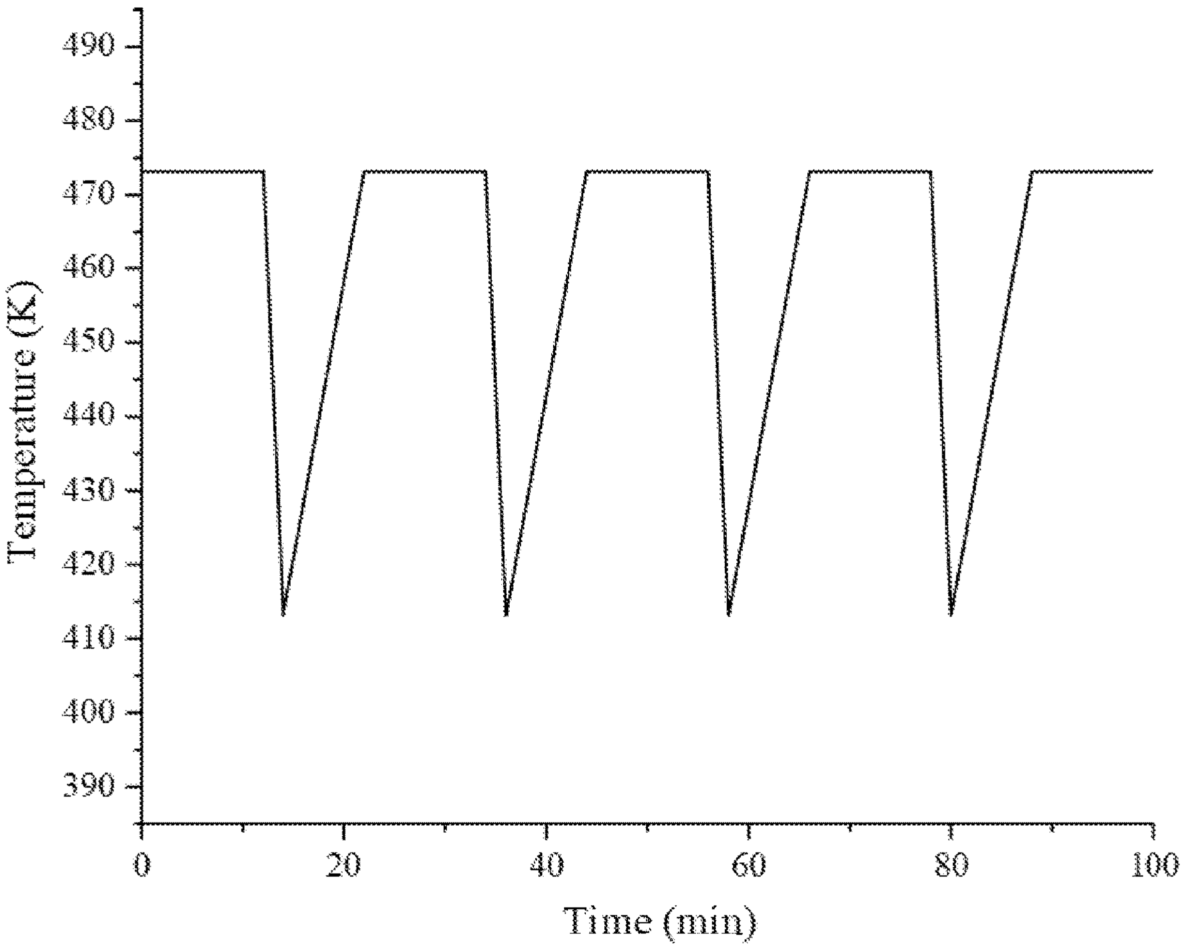
FIG. 9 shows a temperature control procedure of Example 8.

12.5 g of *eucalyptus* fiber was taken (with a lignin content of 33.7%). A liquid-to-solid ratio was set at 10:1 (V:m), 125 mL of an EtOH—$H_2O$ solution with a molar ratio of 1:1 was added to a separation device, and $CO_2$ was injected. A sample to be treated was suspended above a liquid level line, and the separation device was pressed tightly. An initial temperature and an initial pressure of an obtained system were adjusted to 303.15 K and 6 MPa. When the temperature rose to 458.85 K, a separation process of lignin in the *eucalyptus* fiber was controlled according to a temperature control procedure shown in FIG. 9. A yield of a product Klason lignin could reach 78.03%.

Example 9

Figure 10:
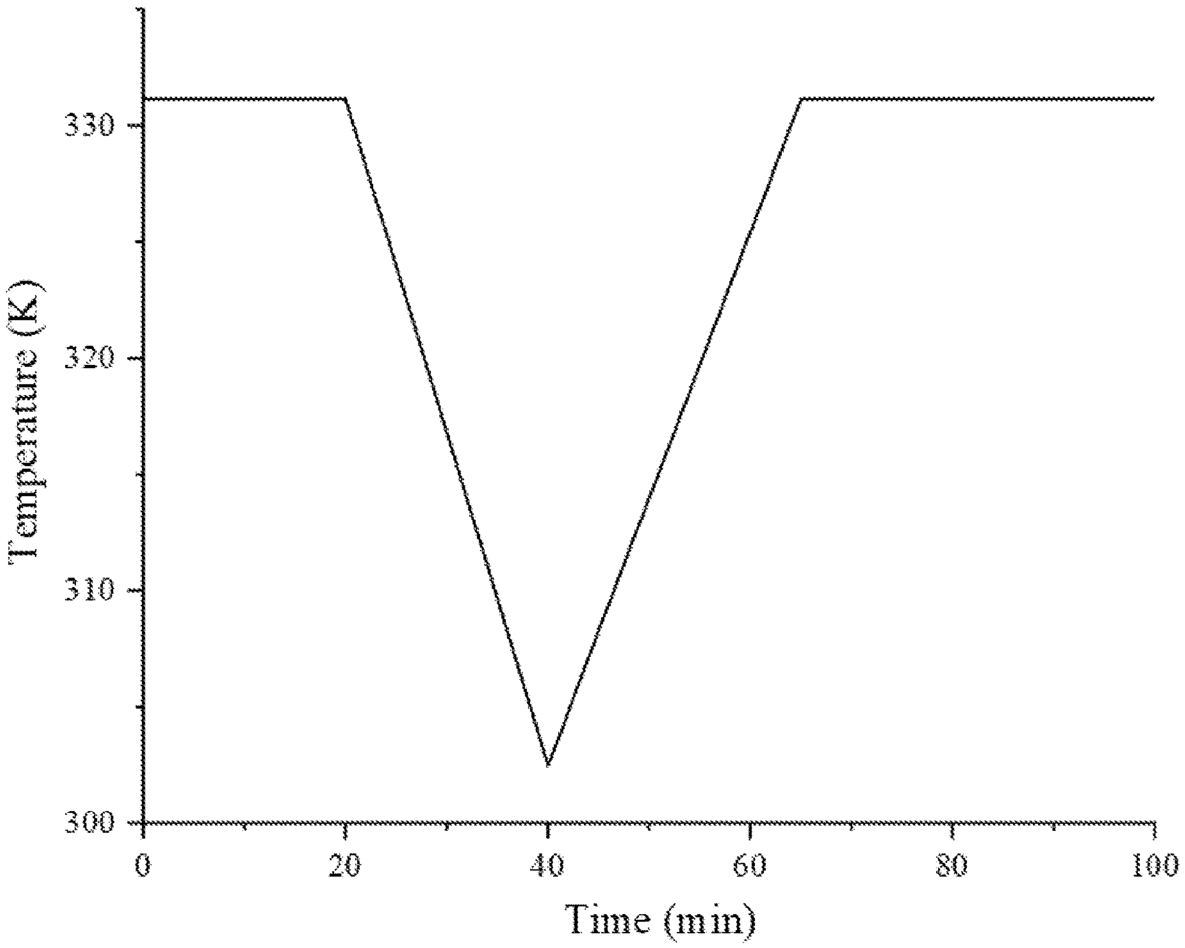
FIG. 10 shows a temperature control procedure of Example 9.

80 g of whole milk powder was taken (with a cholesterol content of 6.1547 mg/100 g). A liquid-to-solid ratio was set at 1:1 (V:m), and 80 mL of ethanol was injected into a separation device. A sample to be treated was suspended above a liquid level line, the separation device was pressed tightly, and $CO_2$ was injected. An initial temperature and an initial pressure of an obtained system were adjusted to 303.15 K and 10 MPa. When the temperature rose to 331.15 K, a separation process of cholesterol in the whole milk powder was controlled according to a temperature control procedure shown in FIG. 10. A separation rate of a product cholesterol could reach 17.2%.

Example 10

Figure 11:
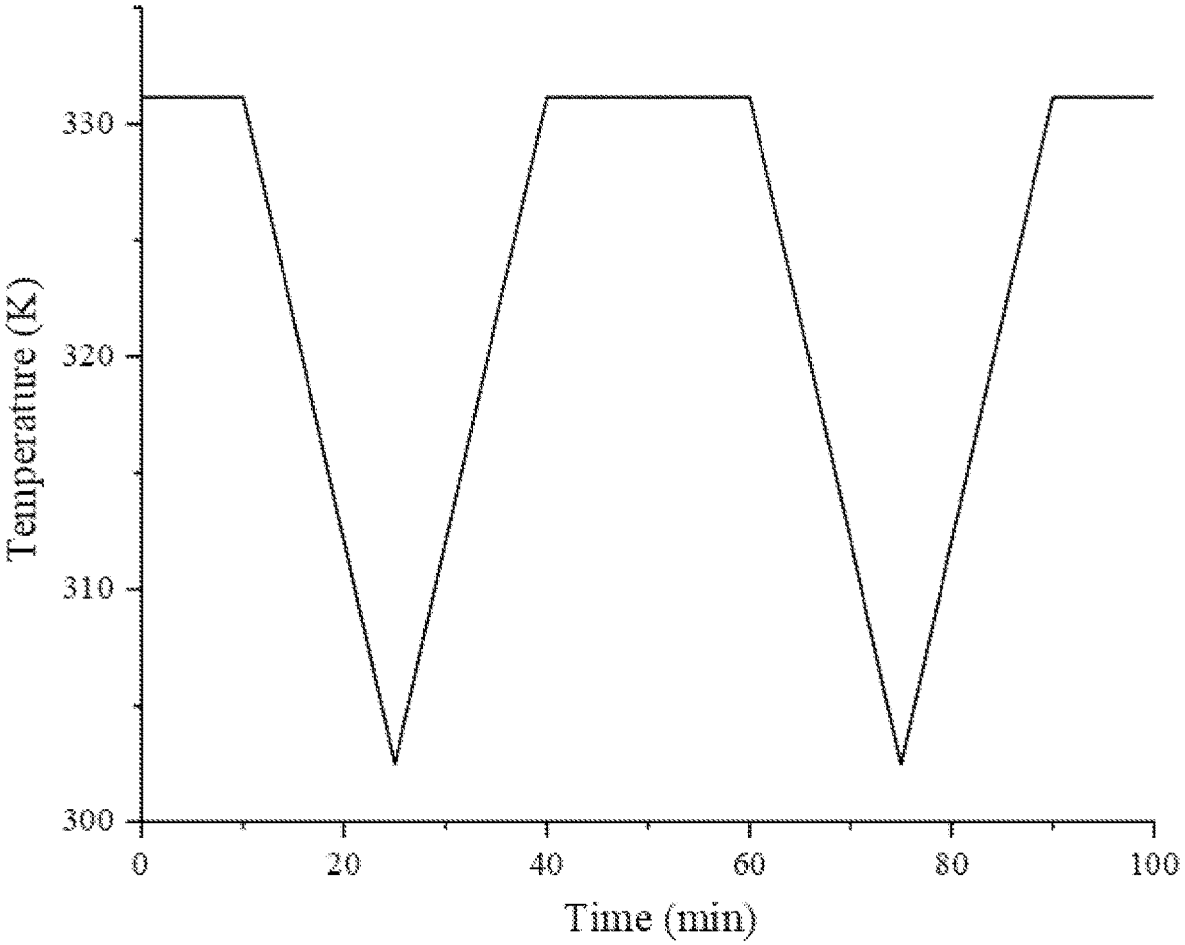
FIG. 11 shows a temperature control procedure of Example 10.

80 g of whole milk powder was taken (with a cholesterol content of 6.1547 mg/100 g). A liquid-to-solid ratio was set at 1:1 (V:m), and 80 mL of ethanol was injected into a separation device. A sample to be treated was suspended above a liquid level line, the separation device was pressed tightly, and $CO_2$ was injected. An initial temperature and an initial pressure of an obtained system were adjusted to 303.15 K and 10 MPa. When the temperature rose to 331.15 K, a separation process of cholesterol in the whole milk powder was controlled according to a temperature control procedure shown in FIG. 11. A separation rate of a product cholesterol could reach 13.7%.

Example 11

Figure 12:
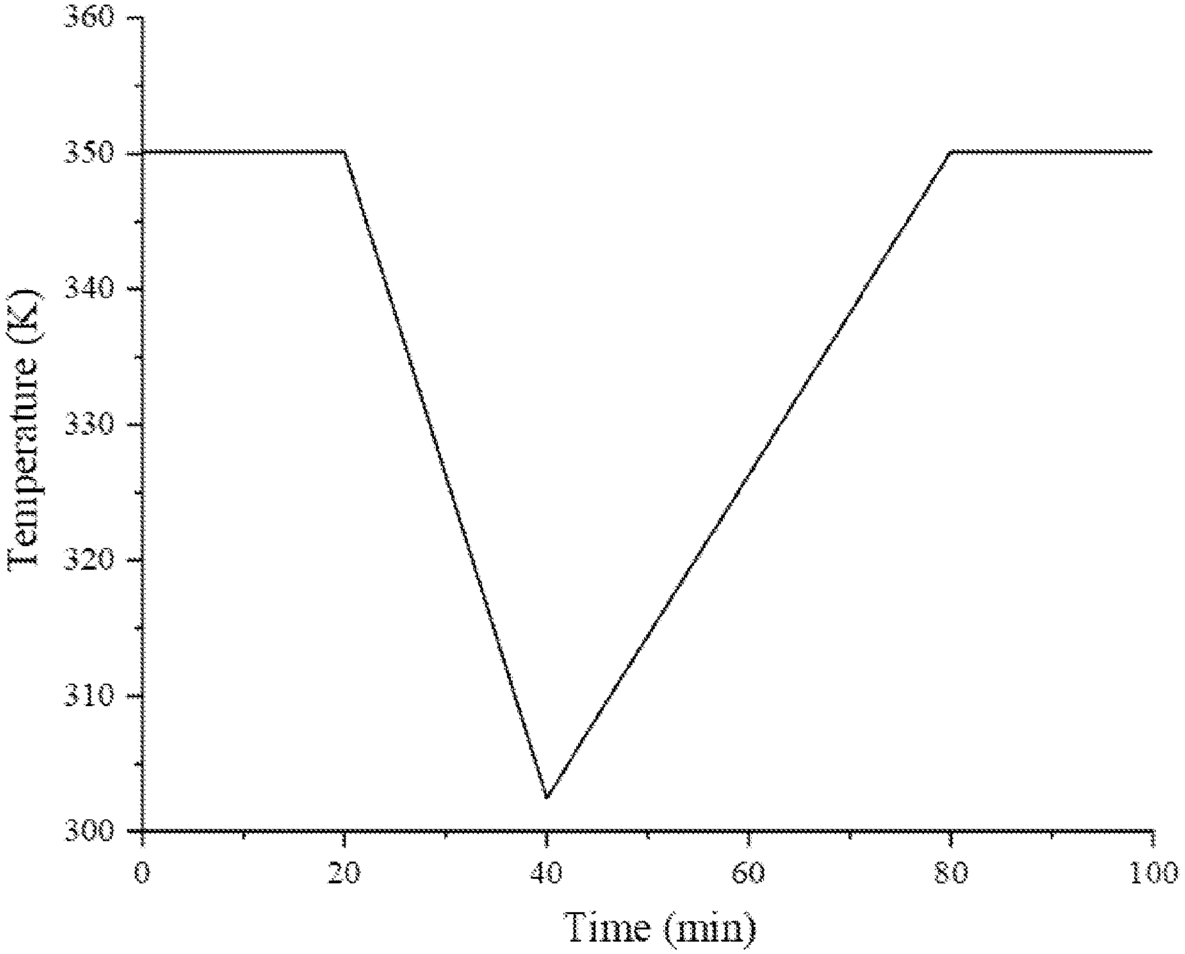
FIG. 12 shows a temperature control procedure of Example 11.

15 g of recycled plastic lunch boxes were taken (with a greasy dirt mass of 3 g). A liquid-to-solid ratio was set at 10:1, and 250 mL of ethanol was injected into a separation device. A sample to be treated was suspended above a liquid level line, the separation device was pressed tightly, and $CO_2$ was injected. An initial temperature and an initial pressure of an obtained system were adjusted to 303.15 K and 6 MPa. When the temperature rose to 350.15 K, a separation process of greasy dirt in the recycled plastic lunch boxes was controlled according to a temperature control procedure shown in FIG. 12. A separation rate of the greasy dirt could reach 91.6%.

Example 12

Figure 13:
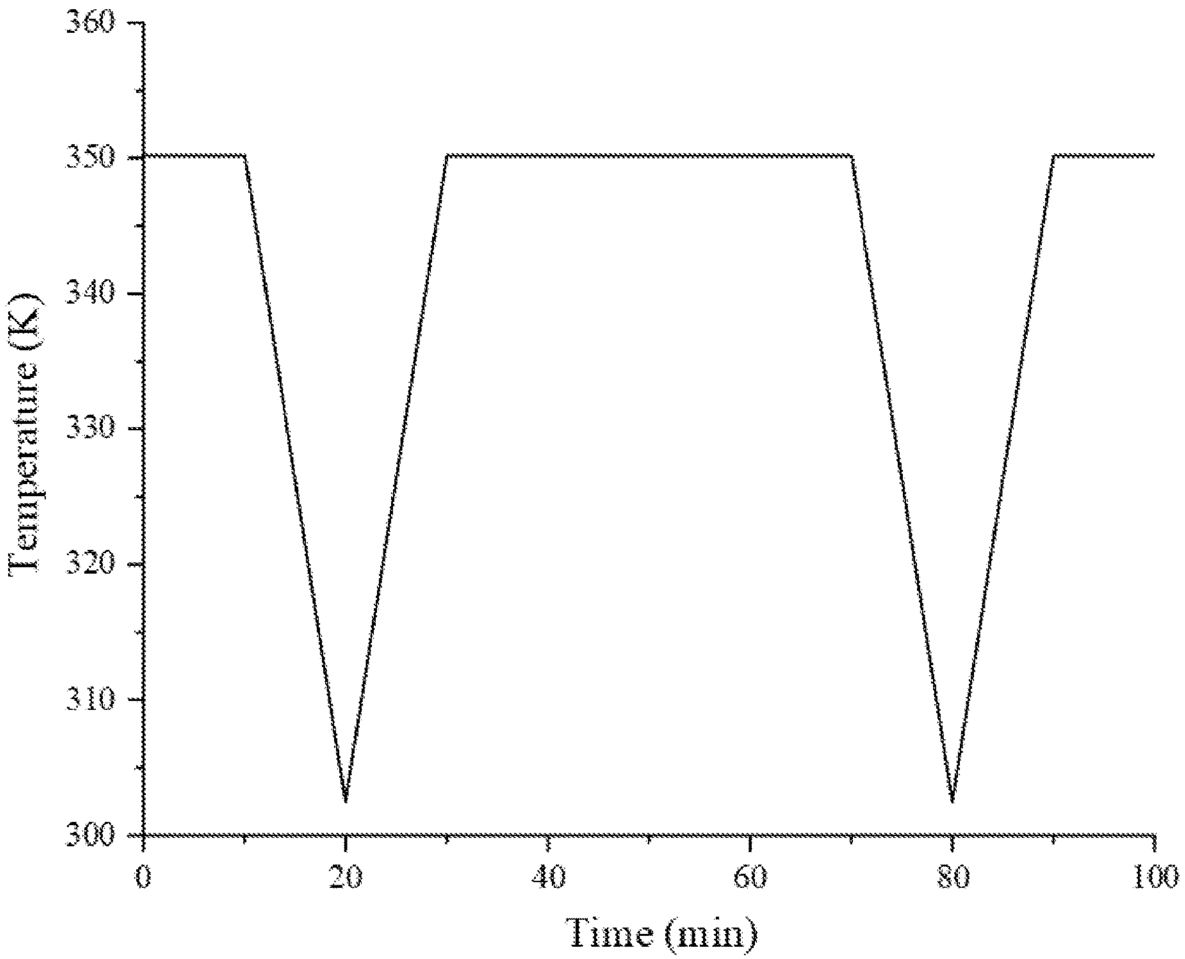
FIG. 13 shows a temperature control procedure of Example 12.

15 g of recycled plastic lunch boxes were taken (with a greasy dirt mass of 3 g). A liquid-to-solid ratio was set at 10:1, and 250 mL of ethanol was injected into a separation device. A sample to be treated was suspended above a liquid level line, the separation device was pressed tightly, and $CO_2$ was injected. An initial temperature and an initial pressure of an obtained system were adjusted to 303.15 K and 6 MPa. When the temperature rose to 350.15 K, a separation process of greasy dirt in the recycled plastic lunch boxes was controlled according to a temperature control procedure shown in FIG. 13. A separation rate of the greasy dirt could reach 95.4%.

Comparative Example 1

12.5 g of *Cannabis sativa* stalk fiber was taken (with a hemicellulose content of 14.8%). A liquid-to-solid ratio was set at 10:1 (V:m), and 125 mL of deionized water was injected into a separation device. A sample to be treated was immersed in the deionized water, the separation device was pressed tightly, and $CO_2$ was injected. An initial temperature and an initial pressure of an obtained system were adjusted to 303.15 K and 6 MPa. When the temperature rose to 458.85 K, constant temperature and pressure were kept. After 100 min, an extraction rate of a product xylan was 1.35 g/100 g.

Comparative Example 2

12.5 g of *Cannabis sativa* stalk fiber was taken (with a hemicellulose content of 14.8%). A liquid-to-solid ratio was set at 10:1 (V:m), and 125 mL of deionized water was injected into a separation device. A sample to be treated was suspended above a liquid level line, the separation device was pressed tightly, and $CO_2$ was injected. An initial temperature and an initial pressure of an obtained system were adjusted to 303.15 K and 6 MPa. When the temperature rose to 458.85 K, constant temperature and pressure were kept. After 100 min, an extraction rate of a hemicellulose degradation product xylan could reach 0.96 g/100 g of raw materials.

Comparative Example 3

12.5 g of *eucalyptus* fiber was taken (with a hemicellulose content of 16%). A liquid-to-solid ratio was set at 10:1 (V:m), and 125 mL of deionized water was injected into a separation device. A sample to be treated was immersed in the deionized water, the separation device was pressed tightly, and $CO_2$ was injected. An initial temperature and an initial pressure of an obtained system were adjusted to 303.15 K and 6 MPa. When the temperature rose to 458.85 K, constant temperature and pressure were kept. After 100 min, an extraction rate of a product xylan was 3.69 g/100 g.

Comparative Example 4

12.5 g of *eucalyptus* fiber was taken (with a hemicellulose content of 16%). A liquid-to-solid ratio was set at 10:1 (V:m), and 125 mL of deionized water was injected into a separation device. A sample to be treated was suspended above a liquid level line, the separation device was pressed tightly, and $CO_2$ was injected. An initial temperature and an initial pressure of an obtained system were adjusted to 303.15 K and 6 MPa. When the temperature rose to 458.85 K, constant temperature and pressure were kept. After 100 min, a yield of a hemicellulose degradation product xylan could reach 1.54 g/100 g of raw materials.

Comparative Example 5

12.5 g of *Cannabis sativa* stalk fiber was taken (with a lignin content of 22%). A liquid-to-solid ratio was set at 10:1 (V:m), and 125 mL of an EtOH—$H_2O$ solution with a molar ratio of 1:1 was added to a separation device. A sample to be treated was immersed in the EtOH—$H_2O$ solution, the separation device was pressed tightly, and $CO_2$ was injected. An initial temperature and an initial pressure of an obtained system were adjusted to 303.15 K and 6 MPa. When the temperature rose to 458.85 K, constant temperature and pressure were kept. After 100 min, a yield of a product Klason lignin reached 29.3%.

Comparative Example 6

12.5 g of *Cannabis sativa* stalk fiber was taken (with a lignin content of 22%). A liquid-to-solid ratio was set at 10:1 (V:m), 125 mL of an EtOH—$H_2O$ solution with a molar ratio of 1:1 was added to a separation device. A sample to be treated was suspended above a liquid level line, the separation device was pressed tightly, and $CO_2$ was injected. An initial temperature and an initial pressure of an obtained system were adjusted to 303.15 K and 6 MPa. When the temperature rose to 458.85 K, constant temperature and pressure were kept. After 100 min, a yield of a product Klason lignin reached 26.4%.

Comparative Example 7

12.5 g of *eucalyptus* fiber was taken (with a lignin content of 33.7%). A liquid-to-solid ratio was set at 10:1 (V:m), and 125 mL of an EtOH—$H_2O$ solution with a molar ratio of 1:1 was added to a separation device. A sample to be treated was immersed in the EtOH—$H_2O$ solution, the separation device was pressed tightly, and $CO_2$ was injected. An initial temperature and an initial pressure of an obtained system were adjusted to 303.15 K and 6 MPa. When the temperature rose to 458.85 K, constant temperature and pressure were kept. After 100 min, a yield of a product Klason lignin reached 45.2%.

Comparative Example 8

12.5 g of *eucalyptus* fiber was taken (with a lignin content of 33.7%). A liquid-to-solid ratio was set at 10:1 (V:m), 125 mL of an EtOH—$H_2O$ solution with a molar ratio of 1:1 was added to a separation device. A sample to be treated was suspended above a liquid level line, the separation device was pressed tightly, and $CO_2$ was injected. An initial temperature and an initial pressure of an obtained system were adjusted to 303.15 K and 6 MPa. When the temperature rose to 458.85 K, constant temperature and pressure were kept. After 100 min, a yield of a product Klason lignin reached 41.9%.

Comparative Example 9

80 g of whole milk powder was taken (with a cholesterol content of 6.1547 mg/100 g). A liquid-to-solid ratio was set at 1:1 (V:m), and 80 mL of ethanol was injected into a separation device. A sample to be treated was immersed into the ethanol, the separation device was pressed tightly, and $CO_2$ was injected. An initial temperature and an initial pressure of an obtained system were adjusted to 303.15 K and 10 MPa. When the temperature rose to 331.15 K, constant temperature and pressure were kept. A separation rate of a product cholesterol could reach 10.2%.

Comparative Example 10

80 g of whole milk powder was taken (with a cholesterol content of 6.1547 mg/100 g). A liquid-to-solid ratio was set at 1:1 (V:m), and 80 mL of ethanol was injected into a separation device. A sample to be treated suspended above a liquid level line, the separation device was pressed tightly, and $CO_2$ was injected. An initial temperature and an initial pressure of an obtained system were adjusted to 303.15 K and 10 MPa. When the temperature rose to 331.15 K, constant temperature and pressure were kept. After 100 min, a separation rate of a product cholesterol could reach 5.7%.

Comparative Example 11

15 g of recycled plastic lunch boxes were taken (with a greasy dirt mass of 3 g). A liquid-to-solid ratio was set at 10:1, and 250 mL of ethanol was injected into a separation device. A sample to be treated was immersed into the ethanol, the separation device was pressed tightly, and $CO_2$ was injected. An initial temperature and an initial pressure of an obtained system were adjusted to 303.15 K and 6 MPa. When the temperature rose to 350.15 K, constant temperature and pressure were kept. A separation rate of the greasy dirt could reach 36.9%.

Comparative Example 12

15 g of recycled plastic lunch boxes were taken (with a greasy dirt mass of 3 g). A liquid-to-solid ratio was set at 10:1, and 250 mL of ethanol was injected into a separation device. A sample to be treated suspended above a liquid level line, the separation device was pressed tightly, and $CO_2$ was injected. An initial temperature and an initial pressure of an obtained system were adjusted to 303.15 K and 6 MPa. When the temperature rose to 350.15 K, constant temperature and pressure were kept. After 100 min, a separation rate of the greasy dirt could reach 79.6%.

The data of the foregoing examples were compared, as shown in Table 1.

TABLE 1

Comparison of yields of natural mixed component separated by different treatment methods

| Extracted substance | Raw material | Extraction method | Yield |
|---|---|---|---|
| Hemicellulose | *Cannabis sativa* | Non-contact with liquid phase, temperature fluctuation 1 time | 2.71 g/100 g |
| | | Non-contact with liquid phase, temperature fluctuation 3 times | 7.21 g/100 g |
| | | Non-contact with liquid phase, temperature keeps unchanged | 0.96 g/100 g |
| | | Immersion in liquid phase at constant temperature | 1.35 g/100 g |
| | Eucalyptus | Non-contact with liquid phase, temperature fluctuation 2 time | 6.99 g/100 g |
| | | Non-contact with liquid phase, temperature fluctuation 4 times | 10.8 g/100 g |
| | | Non-contact with liquid phase, temperature keeps unchanged | 1.54 g/100 g |
| | | Immersion in liquid phase at constant temperature | 3.69 g/100 g |
| Lignin | *Cannabis sativa* | Non-contact with liquid phase, temperature fluctuation 1 time | 41.0% |
| | | Non-contact with liquid phase, temperature fluctuation 3 times | 49.44% |
| | | Non-contact with liquid phase, temperature keeps unchanged | 26.4% |
| | | Immersion in liquid phase at constant temperature | 29.3% |
| | Eucalyptus | Non-contact with liquid phase, temperature fluctuation 2 times | 63.45% |
| | | Non-contact with liquid phase, temperature fluctuation 4 times | 78.03% |
| | | Non-contact with liquid phase, temperature keeps unchanged | 41.9% |
| | | Immersion in liquid phase at constant temperature | 45.2% |
| Cholesterol | Whole milk powder | Non-contact with liquid phase, temperature fluctuation 1 time | 17.2% |
| | | Non-contact with liquid phase, temperature fluctuation 2 times | 13.7% |
| | | Non-contact with liquid phase, temperature keeps unchanged | 5.7% |
| | | Immersion in liquid phase at constant temperature | 10.2% |
| Lunch box greasy dirt | Waste plastic lunch boxes | Non-contact with liquid phase, temperature fluctuation 1 time | 91.6% |
| | | Non-contact with liquid phase, temperature fluctuation 2 times | 95.4% |
| | | Non-contact with liquid phase, temperature keeps unchanged | 79.6% |
| | | Immersion in liquid phase at constant temperature | 89.3% |

It was seen from Table 1 that the method of non-contact with liquid phase and periodically changing the separation temperature provided by the present disclosure could effectively increase a yield of organic matters.

The above are merely preferred implementations of the present disclosure. It should be noted that several improvements and modifications may further be made by a person of ordinary skill in the art without departing from the principle of the present disclosure, and such improvements and modifications should also be deemed as falling within the protection scope of the present disclosure.

What is claimed is:

1. A method for enhanced separation of organic matters in a mixed component with a supercritical fluid combination medium, wherein the supercritical fluid combination medium comprises a supercritical fluid and a cosolvent; and the method comprises the following steps:

placing a mixed component to be separated and the cosolvent in a reaction vessel;

suspending the mixed component to be separated above a liquid level line of the cosolvent; and introducing the supercritical fluid into the reaction vessel to conduct supercritical fluid separation; wherein during the supercritical fluid separation, the mixed component is kept above a liquid level line of the supercritical fluid combination medium, and a separation temperature is changed periodically within a supercritical temperature range of the supercritical fluid combination medium;

wherein the supercritical fluid separation is conducted at 31.26 °C to 200 °C and a pressure of 7.38 MPa to 65 MPa for 10 min to 180 min; and wherein a process of changing the separation temperature periodically comprises: periodically increasing or decreasing the separation temperature by 5 °C to 100 °C.

2. The method according to claim 1, wherein the supercritical fluid is one or more selected from the group consisting of supercritical CO2, supercritical water, supercritical ethanol, supercritical methanol, supercritical ammonia, and a supercritical alkane.

3. The method according to claim 1, wherein the cosolvent is water and/or an organic alcohol.

4. The method according to claim 1, wherein the supercritical fluid and the cosolvent are at a molar ratio of 1:1 to 1:10.

5. The method according to claim 1, wherein the mixed component and the cosolvent are at a mass-to-volume ratio of 1 g:(1-15) mL.

6. The method according to claim 1, wherein the separation temperature is periodically changed 1 to 10 times.

7. The method according to claim 1, wherein the mixed component is a natural mixed component and/or an artificially synthetic mixed component.

8. The method according to claim 7, wherein the natural mixed component is one or more selected from the group consisting of a plant tissue, an animal tissue, and a rock formation containing organic matters.

9. The method according to claim 8, wherein the plant tissue is one or more selected from the group consisting of a *Cannabis sativa* stalk fiber, an *eucalyptus* fiber, a bamboo fiber, Balsa wood, and *Paulownia*; and the animal tissue is one or more selected from the group consisting of a natural dairy product, an animal fat, and an animal carapace.

10. The method according to claim 8, wherein the artificially synthetic mixed component is one or more selected from the group consisting of waste plastics, waste rubber, and ink-containing waste paper.

11. The method according to claim 9, wherein when lignin is separated from a plant fiber, the separation temperature fluctuates 1 to 5 times at an interval of 100 °C to 200 °C, and a heat preservation time in a constant-temperature stage is 5 min to 30 min.

12. The method according to claim 9, wherein when astaxanthin is separated from the animal tissue, the separation temperature fluctuates 1 to 5 times at an interval of 31.26 °C to 70 °C under a pressure of 30 MPa to 65 MPa, and a heat preservation time in a constant-temperature stage is 1 min to 10 min.

13. The method according to claim 9, wherein when cholesterol is separated from the natural dairy product, the separation temperature fluctuates 1 to 5 times at an interval of 31.26 °C to 70 °C under a pressure of 7 MPa to 15 MPa, and a heat preservation time in a constant-temperature stage is 1 min to 10 min.

14. The method according to claim 9, wherein when a fatty acid is separated from the animal fat, the separation temperature fluctuates 1 to 5 times at an interval of 31.26 °C to 50 °C under a pressure of 8 MPa to 20 MPa, and a heat preservation time in a constant-temperature stage is 60 min to 200 min.

15. The method according to claim 2, wherein the cosolvent is water and/or an organic alcohol.

* * * * *